Feb. 25, 1958 P. M. TEDDER 2,824,963

SCREEN-GRID-TO-CONTROL-GRID FEEDBACK CIRCUITS

Filed Feb. 7, 1955

INVENTOR
Paul M. Tedder

BY
W. E. Thibodeau, A. W. Dew and J. P. Edgarton
ATTORNEYS

United States Patent Office
2,824,963
Patented Feb. 25, 1958

2,824,963

SCREEN-GRID-TO-CONTROL-GRID FEEDBACK CIRCUITS

Paul M. Tedder, Gainesville, Fla.

Application February 7, 1955, Serial No. 486,739
7 Claims. (Cl. 250—36)

This invention relates to electronic amplifier and oscillator circuits and more particularly to circuits having a direct-coupled feedback path from a screen grid of an electron tube to a control grid of the tube. By the use of different coupling networks, various embodiments of the invention provide stabilized amplifiers having a variety of frequency response characteristics. The invention also provides stable resistance-capacitance oscillators.

An object of the present invention is to provide stabilized one-stage amplifiers having a wide range of possible frequency attenuation and boosting characteristics, yet requiring no inductances and very few other components.

Another object of the invention is to provide stabilized one-tube oscillators, requiring no inductances and very few other components, in which the frequency of oscillation is substantially unaffected by variations in plate loading.

Other objects, aspects, uses, and advantages of the invention will become apparent from the following description and from the accompanying drawing, in which—

Figure 1:
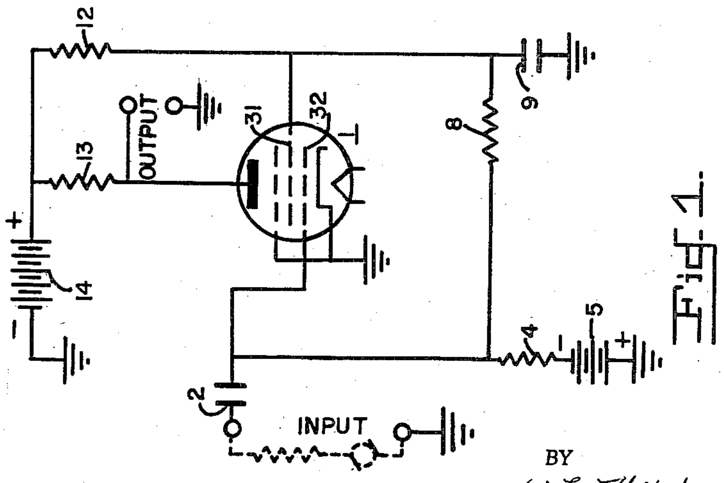
Figure 1 is a schematic diagram of an amplifier in accordance with the invention.

In Fig. 1, the pentode amplifier circuit shown is conventional except for the inclusion of resistance 8, which provides a direct negative feedback path from screen grid 31 to control grid 32 of electron tube 1. This circuit provides compensation for tube characteristics, degeneration of noise or ripple introduced from the bias supply 5, and—by appropriate selection of capacitances 2 and 9 and resistances 4 and 8—low-frequency attenuation of as much as 12 db per octave.

For given operating conditions, the values of resistors 4, 8, and 12 are limited to those which will provide the desired operating bias at control grid 32. By using sufficiently large values of bias supply voltage 5, large feedback factors can be obtained. After I have selected suitable values for resistors 4, 8, and 12, I select values of capacitors 2 and 9 to provide the desired low-frequency shaping.

Figure 2:
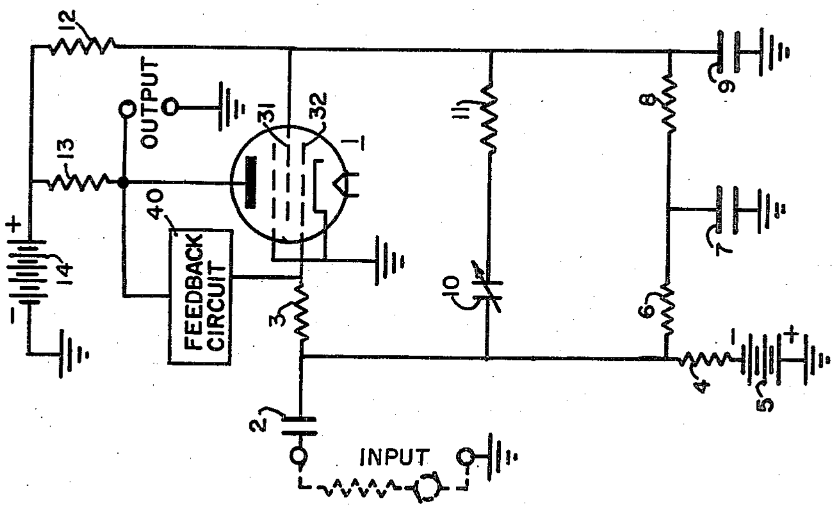
Figure 2 is a schematic diagram of a more versatile form of the amplifier, adapted to provide various frequency response characteristics depending on the values of components selected.

It will be understood that a variety of responsive-shaping feedback networks can be connected between screen grid and control grid within the scope of my invention. Furthermore, additional feedback networks can be connected between plate and control grid. The circuit of Fig. 2 is shown by way of example. It will be noted that, in Fig. 2, bass attenuation of as much as 18 db per ocatve can be obtained by suitable selection of capacitors 2, 7, and 9 and resistances 4, 6, and 8. A feedback circuit 40, which may take various well-known forms, provides additional response-shaping for the amplifier.

Figure 3:
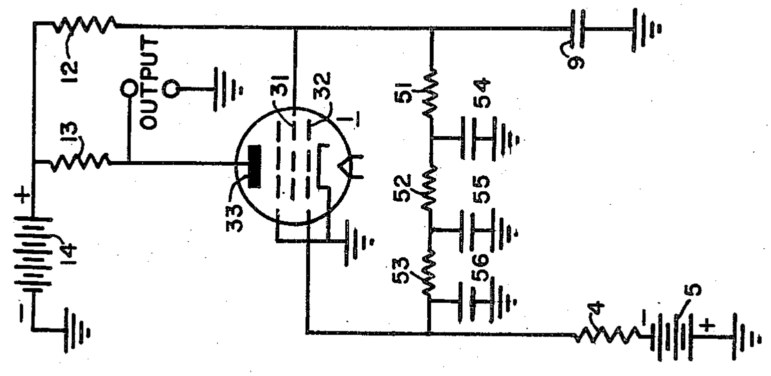
Figure 3 is a schematic diagram of a stabilized electron-coupled resistance-capacitance oscillator in accordance with the invention.

In Fig. 3 I have modified one of my amplifiers to provide a stabilized electron-coupled oscillator. To accomplish this I choose capacitances 54, 55, and 56 in such relation to resistances 51, 52, and 53 that 180 degrees of phase shift is obtained, at the frequency at which oscillation is desired, in the feedback path between screen grid 31 and control grid 32. At D. C. and at low frequencies there is little or no phase shift in the direct-coupled feedback path; stabilization of the operating point is thus provided, as in other embodiments of the invention, and performance is substantially independent of tube characteristics. Synchronizing signals can readily be injected if desired. Although an output signal could be taken from any of several points, I prefer to take the output from plate 33; the output is thus electron-coupled, and output loading has negligible effect on the frequency.

It will be apparent that the embodiments shown are only exemplary and that various modifications can be made in construction and arrangement within the scope of the invention as defined in the appended claims.

I claim:

1. A stabilized amplifier comprising: an electron tube having a cathode, a control grid, a plate, and a screen grid between said control grid and said plate; a first battery connected between said cathode through a first network to said plate and said screen grid; a second battery connected between said cathode through a second network to said control grid; and a two-terminal resistor having only a first and a second electrical connection, said first electrical connection being made directly to said screen grid and said second electrical connection being made directly to said control grid, the resistance of said networks and of said resistor being such in relation to said direct current sources as to maintain said control grid negative with respect to said cathode and to provide substantial direct-current negative feedback from said screen grid to said control grid.

2. An oscillator circuit comprising: an electron tube having a cathode, a control grid, a plate, and a screen grid between said control grid and said plate; a first battery connected between said cathode through a first network to said plate and said screen grid; a second battery connected between said cathode through a second network to said control grid; a resistance connected directly from said screen grid to said control grid, the resistance of said networks and of said resistance being such in relation to said direct current sources as to maintain said control grid negative with respect to said cathode and to provide substantial direct-current negative feedback from said screen grid to said control grid; and a reactive path connected between said screen grid and said control grid providing sufficient positive feedback at at least one frequency to cause said circuit to oscillate.

3. An oscillator circuit comprising: an electron tube having at least a cathode, a control grid, a plate, and a screen grid between said control grid and said plate; direct current power sources supplying to said plate and to said screen grid potentials that are positive with respect to said cathode; a direct-current bias source supplying to said control grid a potential that is negative with respect to said cathode; a resistance connected directly between said screen grid and said control grid to provide a direct-current negative feedback path; and a reactive path between said screen grid and said control grid, said reactive path providing sufficient positive feedback at at least one frequency to cause said circuit to oscillate.

4. The invention according to claim 3, said resistance having a plurality of taps, and said reactive path comprising a plurality of capacitors connected between circuit ground and said taps, said cathode being grounded.

5. A stabilized amplifier comprising: an electron tube having a cathode, a control grid, a plate, and a screen grid between said control grid and said plate; a first battery connected between said cathode through a first network to said plate and said screen grid; a second battery connected between said cathode through said second network to said control grid; and a two-terminal resistor having only a first and a second electrical connection, said first electrical connection being made directly to said screen grid and said second electrical connection being made directly to said control grid; said second battery being of sufficient potential to maintain a negative bias on said control grid with respect to said cathode.

6. In an electron tube amplifier circuit including: an electron tube having at least a cathode, a control grid, a plate, and a screen grid interposed between said control grid and said plate; a D. C. power source furnishing positive supply potentials to said plate and to said screen grid; and means for applying an input signal to said control grid; an improvement for stabilizing the operation of said circuit, said improvement comprising: a two-terminal resistor having only a first and a second electrical connection, said first electrical connection being made directly to said screen grid and said second electrical connection being made directly to said control grid; and a biasing network electrically connected between said cathode and said control grid for biasing said control grid negative with respect to said cathode.

7. An oscillator circuit comprising: an electron tube having at least a cathode, a control grid, a plate, and a screen grid between said control grid and said plate; direct current power sources supplying to said plate and to said screen grid potentials that are positive with respect to said cathode; a direct-current bias source supplying to said control grid a potential that is negative with respect to said cathode; a resistance connected directly between said screen grid and said control grid to provide a direct-current negative feedback path; and a phase-shift network connected between said screen grid and said control grid, said phase shift network providing sufficient positive feedback at at least one frequency to cause said circuit to oscillate at that frequency.

References Cited in the file of this patent

UNITED STATES PATENTS

| | | |
|---|---|---|
| 2,052,986 | Nyman | Sept. 1, 1936 |
| 2,446,106 | Robertson | July 27, 1948 |
| 2,447,375 | Taylor et al. | Aug. 17, 1948 |
| 2,544,017 | Golicke | Mar. 6, 1951 |
| 2,647,983 | Boyd | Aug. 4, 1953 |
| 2,702,839 | Hogue | Feb. 22, 1955 |

OTHER REFERENCES

Radio Engineers Handbook, Terman, 1943, p. 615.